United States Patent
Dufort et al.

(10) Patent No.: US 6,177,112 B1
(45) Date of Patent: Jan. 23, 2001

(54) COMPOSITE PASTRY AND ICE CONFECTIONERY ARTICLE AND PREPARATION THEREOF

(75) Inventors: Christian Dufort, Beauvais; Alain Fournet, Paris; Charles-Austin Sunderland, Goincourt, all of (FR)

(73) Assignee: Nestec S.A., Vevey (CH)

( * ) Notice: Under 35 U.S.C. 154(b), the term of this patent shall be extended for 0 days.

(21) Appl. No.: 09/303,265

(22) Filed: Apr. 30, 1999

(30) Foreign Application Priority Data

May 8, 1998 (EP) .................................................. 98201460

(51) Int. Cl.⁷ .............................. A23G 9/00; A21D 13/08
(52) U.S. Cl. ........................... 426/95; 426/101; 426/502; 426/556; 426/524; 426/583
(58) Field of Search ................ 426/94, 95, 101, 426/556, 583, 502, 524

(56) References Cited

U.S. PATENT DOCUMENTS

| | | | |
|---|---|---|---|
| 4,020,188 | * 4/1977 | Forkner | 426/95 |
| 4,171,380 | * 10/1979 | Forkner | 426/95 |
| 4,293,572 | 10/1981 | Silva et al. | 426/19 |
| 5,182,123 | * 1/1993 | Edo et al. | 426/19 |
| 5,405,626 | * 4/1995 | Van der Graaf et al. | 426/94 |
| 5,693,355 | * 12/1997 | Haas | 426/523 |

FOREIGN PATENT DOCUMENTS

| | | |
|---|---|---|
| 0023250 | 5/1980 | (EP) . |
| 2167934 | 6/1986 | (GB) . |
| 63-105632 | 5/1988 | (JP) . |
| 930459 | 3/1993 | (WO) . |
| 9507025 | 3/1995 | (WO) . |

OTHER PUBLICATIONS

Martha Stewart's Hors D'oevvres Hand book pp. 296–297; pp. 82–83, 1999.*
Goodsell, "Making Danish", Bakers Digest, vol. 59, No. 1, pp. 5, 16 and 21, May, 1985.
Database Abstract, Abstract of Nitto Corn Japanese Patent Document No. 63–105632.

* cited by examiner

Primary Examiner—Nina Bhat
(74) Attorney, Agent, or Firm—Vogt & O'Donnell, LLP

(57) ABSTRACT

A composite product which includes an ice confectionery substance, particularly an ice cream, and a pastry is prepared by superposing brick or filo pastry so that a layered pastry product is formed which has alternating layers of pastry and a fat, the layered pastry product is shaped for containing an ice confectionery substance and baked, and an ice confectionery is introduced therein after applying a moisture-barrier substance so that the ice confectionery is separated from the baked pastry by the moisture-barrier substance.

34 Claims, No Drawings

COMPOSITE PASTRY AND ICE CONFECTIONERY ARTICLE AND PREPARATION THEREOF

BACKGROUND OF THE INVENTION

The present invention relates to composite confectionery articles which include a component made from a dough and an ice confectionery substance and their preparation and to preparation and use of brick and filo pastries.

As an example, composite ice cream confectionery articles consisting of an ice cream combined with a biscuit or a crisp wafer, in particular of the type such as cakes, bars and particularly cones, cigars or sandwiches made of wafer surrounding an ice cream or filled with ice cream, must include a system which makes the biscuit or the wafer impervious to the moisture coming from the ice cream, in order to prevent it from losing its crisp nature, either during storage or during consumption.

Preparation of the composite product is usually carried out by coating either the surface of the biscuit in contact with the ice cream, or the ice cream itself, with a fatty composition, for example with chocolate or with a coating containing chocolate. For example, according to European Patent Application Publication No. 0 023 152, a wafer cone can be lined with a covering layer of liquid fat having the required properties of fluidity and of spreadability by spraying, so as to establish a barrier against the moisture coming from the ice cream filling.

Another process consists, for example, as described in French Patent Application No. 2,574,250, in applying, by roller, a liquid fatty substance close to its solidification point onto a cooked wafer, before it is shaped.

SUMMARY OF THE INVENTION

The aim of the present invention is to provide a composite ice cream confectionery article comprising a thin cooked pastry and an ice cream filling, in which the thin cooked pastry is able to retain a particularly crunchy texture when stored in frozen form and on consumption.

According to the present invention, the cooked pastry is comprised of a superposition of very thin layers of pastry of brick or filo type, and of fat applied in liquid form, with or without addition of a layer of sugar.

The article according to the present invention comprises the combination of ice cream and the cooked pastry which has been shaped, cooked and coated with a barrier to moisture, at least on the parts liable to come into contact with the ice cream.

The present invention also provides a process for preparing the article described above wherein strips of brick or filo pastries are prepared, a liquid fat is applied to the surface of the pastry strips, a plurality of fat-applied strips are superposed or individual strips are folded to obtain layered products so that the applied fat is between strip layers, the layered products are shaped to obtain shaped products having a portion having a shape for containing an ice confectionery substance and the shaped products are supported for maintaining the shape during a cooking step which provides cooked shaped pastry products which retain their shape without support for containing an ice confectionery substance, a moisture-barrier substance is applied on the cooked shaped portion, and then an ice confectionery substance is introduced into the coated portion.

DETAILED DESCRIPTION OF THE INVENTION

In the present invention, layers of very thin pastry, of from 0.2 to 1 mm in thickness, can be brick pastry or filo pastry, strudel pastry or baklava pastry, these last three names in fact denoting the same type of pastry and differing only in their cultural origin. For simplicity, the term "filo pastry" will be used hereinbelow. Filo pastry is commonly used in pastry products of oriental type, such as, for example, baklavas. An important characteristic of this type of pastry is that it contains no sugar in its composition per se.

The term "ice confectionery" used here applies to any ice confectionery, but in particular, sorbet, "sherbet" or milk ice, water ice and ice cream which has been aerated to a greater or lesser extent. Such an article can contain inclusions, in particular marbling or bits or thin flakes, syrup, cooked sugar, fruit pulp, marshmallow, gums, dried or preserved fruit or sweet confectionery such as nougat, truffle or chocolate, where appropriately aerated, or flavoring ingredients, for example spices, alcohols or liqueurs.

Various manufacturing processes are used to manufacture the thin pastry, depending on the nature of the thin pastry used. Thus, brick pastry is cooked on a cylinder from a liquid pastry. Filo pastry is kneaded, rolled out and then dried.

In both cases, a continuous strip of pastry can be produced, which can be cut into the desired shape.

A sequence of one to three operations can be carried out to make the thin pastry, preferably a sequence of the following operations:

a liquid fat is applied, with or without sugar, preferably by spraying onto the upper surface of the piece, and fat-applied pieces are layered for piece is folded onto so that layers of pastry are superposed, so as to imprison the fat, with or without sugar, between the layers of pastry.

From 2 to 10 layers of pastry, preferably about 6 layers, are thus obtained.

The piece made of thin pastry is then shaped by rolling it up on itself or by rolling it up partially around a mandrel or by stamping in order to give it the desired shape and to from a portion shaped for containing an ice confectionery substance. Depending on the nature of the mandrel, for example cylindrical or circular, oval, rounded and flattened or conical cross-section, a cigar, a tray, a pancake or a cone of circular or oval cross section can thus be made. Shaping can thus be carried out by partial rolling-up, for example of pieces in the shape of round pancakes in order to curve them into a "taco" shape. A dish or a tray serving as a container for the ice cream, generally of half-moon shape, can be formed, for example, by stamping.

Once it has been shaped, a layer of liquid sugar can be applied to the outer surface of the piece of pastry, preferably by spraying.

The impregnated piece of pastry is then taken up on a support for maintaining its shape, and it is then cooked on its support at about 160–200° C. for about 1–15 min. During this cooking, the pastry is made crunchy and its rigidity is ensured. The piece of pastry can be cooked between two heated elements, for example between a female matrix and a male punch.

After cooling, for example to room temperature or to a lower temperature, a moisture-barrier film, for example a fatty composition such as a liquid chocolate or a "compound", is sprayed onto the part liable to come into contact with the ice cream filling, i,e., the portion shaped for containing an ice confectionery.

The thin cooked pastry is then filled with the ice cream. As a variant, the ice cream filling can be coated with an above barrier film and introduced into the thin cooked pastry.

The thin cooked pastry can also be used as a component of a product such as ice cream sweets, chocolates, bars or cakes in combination with or coated with a coating of chocolate or of "compound".

The ice confectionery article thus produced differs from the known products by the type of pastry, brick pastry or filo pastry, as a superposition of very thin layers, which has never been used previously in combination with ice cream. This combination gives it particularly long-lasting crunchiness since the pastry confectionery article is particularly resistant to the uptake of moisture over time on account of its constitution. The article also has a complex flavour, giving novel organoleptic sensations associated with the combination of the specific cooked pastry and the ice cream.

EXAMPLES

The examples below illustrate the invention. In these examples, the parts and percentages are given on a weight basis, except where otherwise indicated.

Example 1

A filo pastry is manufactured from a dough whose composition is as follows:

| Ingredient | % |
| --- | --- |
| Wheat flour (extra strong, gluten-rich) | 67.8 |
| Water | 27.4 |
| Oil | 2.7 |
| Salt | 1.4 |
| Gluten | 0.7 |

Eggs can be added to this formulation. A flavouring such as a cocoa powder can also be added thereto.

The ingredients are mixed together in a mixer (Kemper) at slow speed for 1 min., and then at rapid speed for 4 min., until a smooth, elastic, cohesive pastry is obtained. The pastry is then transferred into an extruder (Rademaker BV) which puts the pastry in the form of a thin layer, and it is rolled out and dried in an infrared dryer. The pastry is then superposed in 6 layers with a spraying of oil, or of butter with or without a sugar solution between each layer, and then pieces with a final thickness of 0.3 mm and of desirable shape are cut out in order to produce a cone-shaped cornet after rolling-up.

The pastry is then rolled up around a conical-shaped mandrel with successive covering of the layers. After spraying a concentrated sugar solution on its outer surface, the product is taken up on a conical support and cooked at 2000C for about 5 min. After cooling for 2 min., the cornet is removed from the mould, sprayed with liquid chocolate so as to coat its inner surface, and is filled with vanilla ice cream, the filling finishing with a decoration in the shape of a flame.

The cooked pastry has a beautiful golden colour and all of its organoleptic qualities remain intact after storing in frozen form for several months, and in particular its crunchiness.

Example 2

A brick pastry is produced using a liquid dough whose composition is as follows:

| Ingredient | % |
| --- | --- |
| Wheat flour | 35.3 |
| Water | 59.6 |
| Oil | 3.1 |
| Salt | 1 |
| Lecithin | 1 |

The ingredients are dispersed in a turbo-mixer. The liquid dough is then cooked on cylinders, in a pancake oven (SEP EGMO, Groupe Bastide) at 200° C. on the first roller and 170° C. on the second roller, the pastry being measured out on the first roller so as to form round pancakes.

The pancakes are sprinkled with a liquid fatty substance with or without sugar syrup, and are folded in two. The pieces of pastry are refolded or rolled up in successive layers around a conical mandrel. A thin pastry comprising 4 to 6 layers, of from 0.2 to 1 mm in thickness, is thus obtained. After cooking the shaped pastry at 200° C. for 5 min., a nicely golden cornet is obtained. The cooked cornet is then cooled for 2 min. and is removed from the mould. It is sprayed with liquid chocolate so as to coat its inner surface, and is filled with ice cream.

The thin cooked pastry has a beautiful golden color and all of its organoleptic qualities remain intact after storage in frozen form for several months, and in particular its crunchiness.

Example 3

The process is performed as in Example 2, except that, in order to produce a pastry cornet, the thin pastry is cooked at 200° C. for 60 sec. in a mold between two male and female parts.

What is claimed is:

1. A process for preparing composite confectionery articles comprising:

preparing strips of a pastry selected from the group consisting of brick pastry and filo pastry;

applying a liquid fat to a surface of the pastry strips to obtain strips having a fat-applied surface and superposing the fat-applied strips by layering a plurality of strips or by folding individual strips to obtain layered products wherein the applied fat is between pastry strip layers;

shaping the layered products to obtain shaped products having a portion having a shape for containing an ice confectionery substance and supporting the shaped products for maintaining their shape;

cooking the supported shaped products to obtain cooked shaped pastry products which retain their shape without support for containing an ice confectionery substance;

applying a moisture-barrier substance on the cooked shaped portion of the shaped products to obtain a moisture-barrier coated portion for containing an ice confectionery substance; and introducing an ice confectionery substance into the coated portion of the shaped products to obtain composite confectionery articles.

2. A process according to claim 1 wherein the strips have a thickness of from 0.2 mm to 1 mm.

3. A process according to claim 1 or 2 wherein the layered products have from 2 to 10 pastry layers.

4. A process according to claim 1 wherein the supported shaped products are cooked at a temperature of from about 160° C. to 200° C.

5. A process according to claim 4 wherein the strips have a thickness of from 0.2 mm to 1 mm and wherein the layered products have from 2 to 10 pastry layers.

6. A process according to claim 1 wherein the moisture-barrier substance is sprayed onto the cooked shaped portion.

7. A process according to claim 1 wherein the moisture-barrier substance is a fatty composition.

8. A process according to claim 6 wherein the fatty composition is a chocolate composition.

9. A process according to claim 1 further comprising applying sugar with the liquid fat.

10. A process according to claim 1 further comprising applying sugar to a surface of the shaped pastry products.

11. A process according to claim 1 further comprising cooling the cooked shaped pastry products prior to applying the moisture-barrier substance.

12. A process according to claim 6 wherein the layered products are rolled to obtain the shaped pastry products.

13. A process according to claim 12 wherein the layered products are rolled around a mandrel to obtain the shaped products.

14. A process according to claim 1 wherein the layered products are stamped to obtain the shaped products.

15. A process according to claim 1 wherein the ice confectionery substance is selected from the group consisting of ice cream, ice milk, sorbet, sherbert and ice.

16. A process according to claim 1 wherein the ice confectionery substance is ice cream.

17. A process according to claim 1 wherein the pastry strips are prepared without a sugar ingredient.

18. The composite confectionery article of the process of claim 1.

19. The composite confectionery article of the process of claim 3.

20. The composite confectionery article of the process of claim 5.

21. The composite confectionery article of the process of claim 9.

22. The composite confectionery article of the process of claim 15.

23. The composite confectionery article of the process of claim 16.

24. The composite confectionery article of the process of claim 17.

25. A composite confectionery article which comprises;

a cooked pastry product selected from the group consisting of cooked brick pastry and cooked filo pastry, wherein the cooked pastry product comprises superposed layers of the cooked pastry and a fat wherein the fat is positioned between each pastry layer and wherein the pastry product has a shape configured which provides a portion for containing an ice confectionery substance;

a moisture-barrier substance coated on the portion;

an ice confectionery substance positioned in the moisture-barrier coated portion.

26. A confectionery article according to claim 25 wherein the strips have a thickness of from 0.2 mm to 1 mm.

27. A confectionery article according to claim 25 or 26 wherein there are from 2 to 10 strips.

28. A confectionery article according to claim 25 wherein the moisture-barrier substance is a fatty composition.

29. A confectionery article according to claim 28 wherein the fatty composition is a chocolate composition.

30. A confectionery article according to claim 25 wherein sugar is combined with the fat.

31. A confectionery article according to claim 25 wherein sugar is present on a surface of the article.

32. A confectionery article according to claim 25 wherein the ice confectionery is selected from the group consisting of ice cream, ice milk, sorbet, sherbert and ice.

33. A confectionery article according to claim 25 wherein the ice confectionery is ice cream.

34. A confectionery article according to claim 25 or 32 wherein the pastry product has a shape selected from the group consisting of a cornet shape, a cigar shape, a taco shape, a disk shape and a tray shape.

* * * * *

UNITED STATES PATENT AND TRADEMARK OFFICE
CERTIFICATE OF CORRECTION

PATENT NO. : 6, 177, 112
DATED : January 23, 2001
INVENTOR(S) : Christian DUFORT, et al.

It is certified that error appears in the above-identified patent and that said Letters Patent is hereby corrected as shown below:

Column 5, line 17 (line 1 of claim 12), delete "6" and insert therefor -- 1 --.

Signed and Sealed this

Twenty-ninth Day of May, 2001

Attest:

NICHOLAS P. GODICI

Attesting Officer      Acting Director of the United States Patent and Trademark Office